(12) United States Patent
Ede

(10) Patent No.: US 8,271,714 B2
(45) Date of Patent: Sep. 18, 2012

(54) INTERFACE FOR SERIAL DATA COMMUNICATION

(75) Inventor: Clifford Ede, Surrey (GB)

(73) Assignee: Nokia Corporation, Espoo (FI)

( * ) Notice: Subject to any disclaimer, the term of this patent is extended or adjusted under 35 U.S.C. 154(b) by 1372 days.

(21) Appl. No.: 10/732,063

(22) Filed: Dec. 10, 2003

(65) Prior Publication Data

US 2005/0134321 A1 Jun. 23, 2005

(30) Foreign Application Priority Data

Dec. 9, 2003 (GB) .................................. 0328469.2

(51) Int. Cl.
*G06F 13/14* (2006.01)
*G06F 13/42* (2006.01)

(52) U.S. Cl. ........................................ 710/305; 710/106
(58) Field of Classification Search .................... 377/12; 327/1; 324/691; 713/330; 710/305
See application file for complete search history.

(56) References Cited

U.S. PATENT DOCUMENTS

| | | | | |
|---|---|---|---|---|
| 5,568,610 A * | 10/1996 | Brown | ............................ | 714/48 |
| 5,799,196 A * | 8/1998 | Flannery | ....................... | 713/320 |
| 6,062,480 A * | 5/2000 | Evoy | ............................... | 235/492 |
| 6,138,182 A * | 10/2000 | Hennessy et al. | ................ | 710/16 |
| 6,415,342 B1 * | 7/2002 | Wahl et al. | ..................... | 710/100 |
| 6,523,081 B1 * | 2/2003 | Karlsson et al. | ............... | 710/305 |
| 6,668,296 B1 | 12/2003 | Dougherty et al. | ............ | 710/303 |
| 6,671,765 B1 * | 12/2003 | Karlsson et al. | ............... | 710/310 |
| 6,737,868 B2 * | 5/2004 | Takagi | ........................... | 324/414 |
| 6,753,921 B1 * | 6/2004 | Shimizu | ......................... | 348/372 |
| 6,760,333 B1 * | 7/2004 | Moody et al. | ............... | 370/395.1 |
| 6,963,933 B2 * | 11/2005 | Saito et al. | ......................... | 710/1 |
| 6,986,071 B2 * | 1/2006 | Darshan et al. | ................ | 713/330 |
| 7,215,670 B1 * | 5/2007 | Karlsson et al. | ............ | 370/395.1 |
| 7,383,371 B2 * | 6/2008 | Kasahara | ....................... | 710/305 |
| 2002/0084988 A1 | 7/2002 | Kuo | ................................ | 345/168 |
| 2003/0146765 A1 * | 8/2003 | Darshan et al. | ................ | 324/539 |
| 2003/0158990 A1 * | 8/2003 | Allen et al. | .................... | 710/305 |
| 2003/0212841 A1 * | 11/2003 | Lin | ................................. | 710/62 |
| 2004/0088449 A1 * | 5/2004 | Sakaki | ............................ | 710/15 |
| 2004/0133820 A1 * | 7/2004 | Tanabe et al. | .................. | 713/600 |

OTHER PUBLICATIONS

Ogren, Erik; "USB On-The-Go presents benefits, challenges to power designers"; May 2, 2003; available on www.commsdesign.com; pp. 1-3.*
Chandler, et al.; "On-The-Go Supplement to the USB 2.0 Specification"; Revision 1.0; Dec. 18, 2001.
Chandler, et al.; "On-The-Go Supplement to the USB 2.0 Specification"; Revision 1.0a; Jun. 24, 2003.

* cited by examiner

*Primary Examiner* — Ryan Stiglic
(74) *Attorney, Agent, or Firm* — Harrington & Smith

(57) ABSTRACT

An interface for serial data communication, comprising: a power signal contact having an associated impedance; at least one data signal contact; and sensing means for automatically sensing a discrete change in the impedance associated with the power signal contact. A method of checking a serial data connection between a host and a peripheral that are not involved in a data communication session, the method comprising: sensing a discrete change in an impedance associated with a contact that is used, during a session, for transferring power from the host to the peripheral.

56 Claims, 5 Drawing Sheets

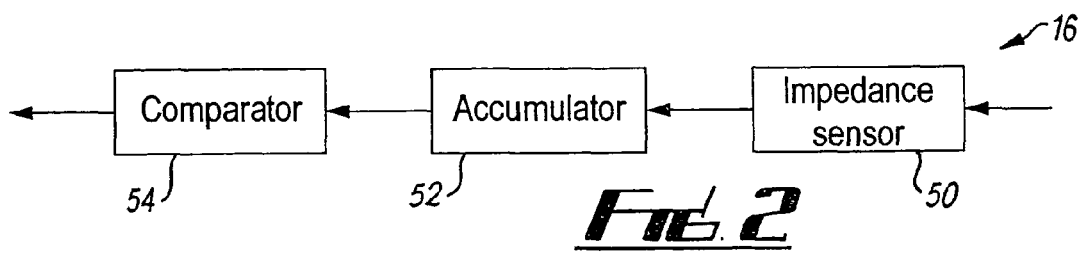
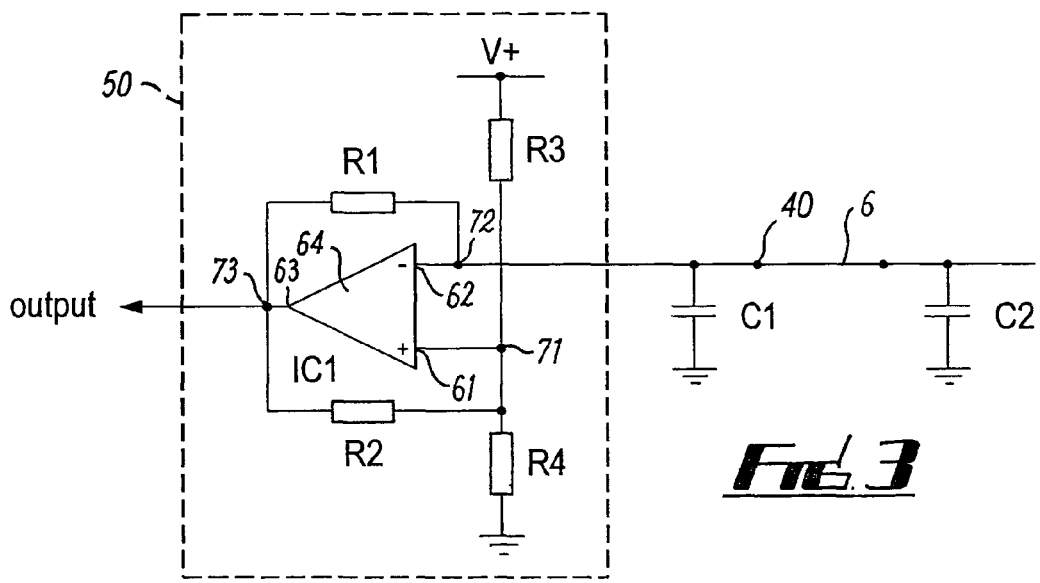
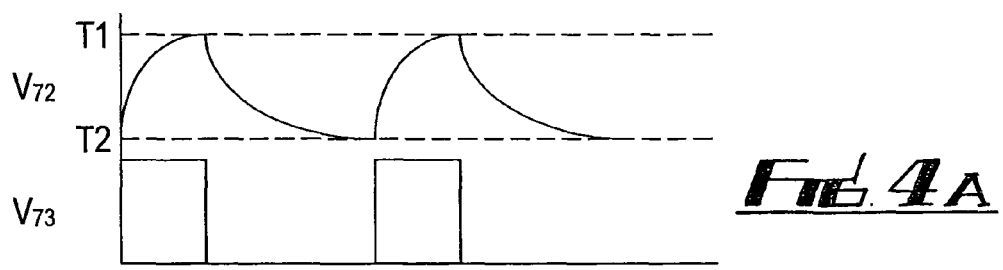
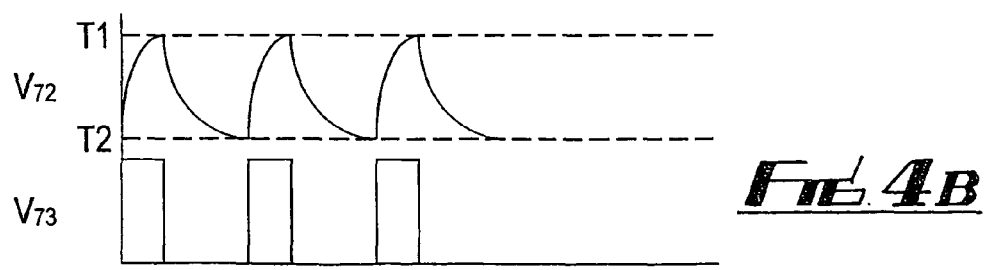

INTERFACE FOR SERIAL DATA COMMUNICATION

TECHNICAL FIELD

Embodiments of the invention relate to an interface for serial data communication. In particular, embodiments relate to a Universal Serial Bus (USB) interface.

BACKGROUND OF THE INVENTION

The Universal serial bus (USB) is a cable bus that supports data exchange between a host and a wide range of simultaneously accessible peripherals. The attached peripherals share USB bandwidth through a host-scheduled, token-based protocol.

The USB system transfers data in bit serial format between the USB host and the USB peripheral. There is only one host in a USB system and it is master of the bus.

In USB the role of host and peripheral is defined by which end of the cable a device is connected. If a device has an A receptacle for connection to an A-plug of the cable it is an A-device and if it has a B receptacle for connection to a B-plug it is a B-device. In USB an A-device provides power via a power contact Vbus to the B-device. The A-device is always the host and the B-device is always the peripheral.

The USB On-The-Go (OTG) supplement to USB allows a device to be dual mode. A dual mode device has a mini A/B connector that allows it to be connected to a mini A-plug as an A-device or to be connected to a mini B-plug as a B-device. As a default a dual mode device when connected as an A-device operates as a default host and when connected as a B-device operates as a default peripheral. However, OTG will enable the role of the dual-role device to change without reversing the cable. Thus the OTG device will be able to operate as a host or peripheral whether it is connected as an A-device or a B-device.

On-the-Go will also provide power saving features. In order to conserve power, OTG will allow an A-device to leave Vbus turned off when the serial bus is not being used.

However, turning off Vbus has, as yet unappreciated disadvantages. In the absence of Vbus it is not possible for one device to detect automatically whether it has become connected to a device, or it is still connected to another device, or it is now connected to a different device. It would be desirable to maintain lower power consumption but enable automatic detection.

BRIEF SUMMARY OF THE INVENTION

According to one aspect of the invention there is provided an interface for serial data communication, comprising: a power signal contact having an associated impedance; at least one data signal contact; and sensing means for automatically sensing a discrete change in the impedance associated with the power signal contact.

According to another aspect of the invention there is provided a method of checking a serial data connection between a host and a peripheral that are not involved in a data communication session, the method comprising:
    sensing a discrete change in an impedance associated with a contact that is used, during a session, for transferring power from the host to the peripheral.

Embodiments of the invention enable power saving and the automatic detection of connection/disconnection of a USB device without user intervention.

In one embodiment the sensing means is for automatically sensing a discrete change in capacitance.

In another embodiment the sensing means is for automatically sensing a discrete change in resistance.

BRIEF DESCRIPTION OF DRAWINGS

For a better understanding of the present invention reference will now be made by way of example only to the accompanying drawings in which:

FIG. 2 illustrates sensing circuitry for the first and second embodiments;

FIG. 3 illustrates an impedance sensor for use in the sensing circuitry of FIG. 2;

FIGS. 4A and 4B illustrate input and output voltages of the impedance sensor of FIG. 3 when the first and second devices are respectively connected and disconnected.

DETAILED DESCRIPTION OF EMBODIMENT(S) OF THE INVENTION

Figure 1:
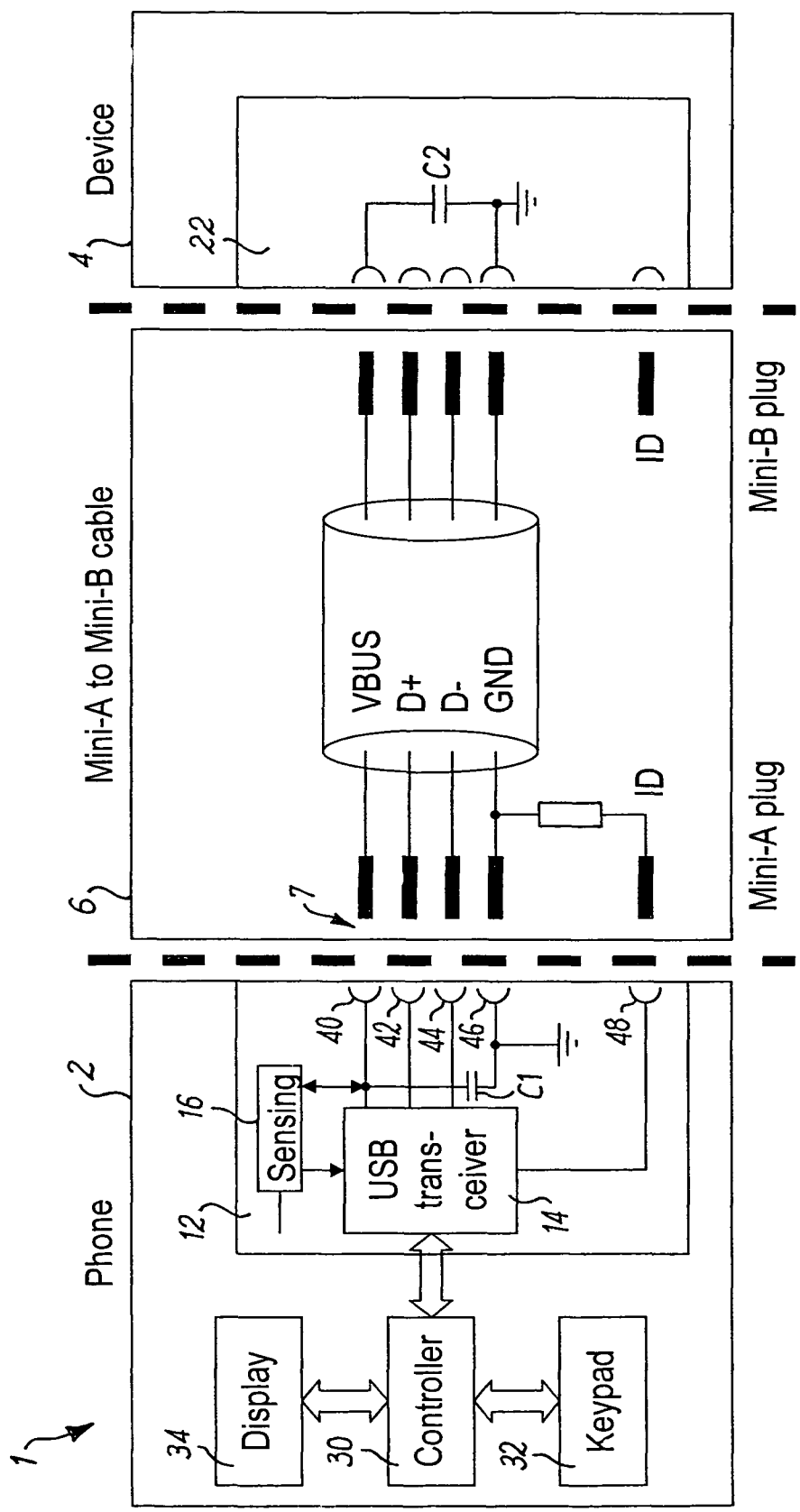
FIG. 1 illustrates a Universal Serial Bus (USB) system according to a first embodiment.

FIG. 1 illustrates a Universal Serial Bus (USB) system 1 comprising a first USB device 2 connected to a second device 4 using a cable 6.

The first USB device 2 is, in this example, a dual-mode device and has an interface 12 including a A/B mini receptacle (not shown). The A/B receptacle receives a mini A-plug 7 at one end of the cable 6. The interface 12 may therefore be referred to as an A/B interface but it operates, when connected as shown, as an A-interface or a default host interface.

The second USB device 4 is, in this example, a peripheral device and has an interface 22 including a mini B receptacle (not shown). In other examples, the mini B receptacle could be replaced with a mini A/B receptacle. The mini B receptacle receives a mini B-plug 8 at the other end of the cable 6. The interface 12 may therefore be referred to as a B-interface or peripheral interface.

Although a cable 6 is illustrated it should be appreciated that adapters, dongles or the like may be connected directly to the A-interface 12 without a cable. Although a mini A-plug to mini B-plug cable is illustrated, in other examples such as when the receptacle of the B-interface 22 has a standard B receptacle a mini A-plug to standard B-plug cable may be used.

The A/B interface 12 of the dual-mode device 2 comprises a USB transceiver 14 and five pin contacts. The first pin contact 40 (Vbus) is used to provide power from the A-device to the B-device. The second pin contact 42 (D+) and the third pin contact 44 (D−) are used as differential data lines for transmitting data between connected devices. The fourth pin contact 46 (GND) is used as an earth or ground. The fifth pin contact 48 (ID) is used to detect, in the dual mode device 2, whether it is connected to a mini A-plug or a mini B-plug. A mini A-plug connects, when inserted, the fifth pin contact 48 (ID) to the fourth pin contact (GND) via a resistor. A mini B-plug, when inserted, leaves the fifth pin contact 48 (ID) isolated.

The first pin contact 40 is connectable to a 5V voltage supply by the USB transceiver 14 during a serial data communication session and to sensing circuitry 16 otherwise.

The A/B interface 12 is capable of detecting automatically, without user intervention, a device connected to it using the sensing circuitry 16. The sensing circuitry 16 automatically senses a discrete change in the impedance associated with the first pin contact 40.

The impedance associated with the first pin contact 40 has a first value when the first USB device 2 and the second USB device 4 are not connected and a second value when the first USB device 2 and the second USB device 4 are connected. The sensing circuitry 16 senses automatically a discrete change in the impedance associated with the first pin contact 40 from the first value to the second value. The sensing circuitry 16 also senses automatically a change in the impedance from the second value to the first value.

As the A/B interface 12 is connected as a default host interface in this example, the USB transceiver 14 applies a voltage to the first pin contact in response to a discrete change in the impedance associated with the first pin contact. This starts a session for serial data communication.

Enumeration may then occur. This is the process described in the USB specifications by which the second device 4 is allocated an address and data is sent from the second device 4 to the default host device 2 that identifies the capabilities of the second device 4 and enables communications between the first device 2 and the second device 4.

The first device 2 may comprise, in addition to A/B-interface 12, a controller 30, a keypad 32 and a display 34. The controller 30 is connected to provide outputs to the display 34 and the A/B interface 12 and to receive inputs from the keypad 32 and the USB transceiver 14 of the A/B interface 12.

The USB transceiver 14 provides a detection signal to the controller 30 in response to a discrete change in the impedance associated with the first pin contact. The controller 130 discovers the capabilities of the connected second device 4 during the process of enumeration.

The controller 30 may consequently control the display 34 to indicate when a device is connected or disconnected from A/B-interface 12. If a device is newly connected the controller 30 may automatically start a related application or display an identification of the device on the display 34.

The sensing circuitry 16 includes an impedance sensor 50, an accumulator 52 and a comparator 54 as illustrated in FIG. 2. In this embodiment the sensing circuitry 16 senses a stepwise change in the capacitance associated with the first pin contact 40. The impedance sensor 50 applies an alternating voltage signal to the first pin contact 40. For USB compliance, this voltage should be less than 0.2V.

The A/B interface 12 has a capacitance C1 between the first pin contact 40 and ground. The B-interface 22 has a capacitance C2 between the pin that connects via cable 6 to the first pin contact 40 and ground. In the unconnected state, the capacitance associated with the first pin contact 40 is C1. In the connected state the capacitance associated with the first pin contact is C1+C2 as C1 and C2 are then connected in parallel.

The USB specification requires that all compliant devices have a Vbus to Gnd capacitance of at least 1 uF. As a consequence C1 and C2 are both approximately matched. One or other or both may be greater than one microfarad.

The impedance sensor 50 may be arranged in one implementation so that the applied alternating voltage signal has a frequency that is dependent upon the capacitance associated with the first pin contact. A change in the frequency of the alternating voltage signal indicates a change in capacitance. In this example, the accumulator 52 detects the current frequency and the comparator 54 compares that frequency with the previously detected frequency. The comparator 54 can therefore detect a change in frequency.

Alternatively, the impedance sensor 50 may be arranged in another implementation so that the applied alternating voltage signal has a fixed frequency and an amplitude that is dependent upon the capacitance associated with the first pin contact. A change in the amplitude of the alternating voltage signal indicates a change in capacitance. In this example, the accumulator 52 detects the current amplitude, for example by integration, and the comparator 54 compares that amplitude with the previously detected amplitude. The comparator 54 can therefore detect a change in amplitude.

FIG. 3 illustrates an impedance sensor 50 that applies an alternating voltage signal to the first pin contact 40. The alternating voltage has a frequency dependent upon the capacitance associated with the first pin contact 40. The impedance sensor 50 is formed from an op-amp relaxation oscillator 64.

An op-amp 64 has a +ve input 61, a −ve input 62 and an output 63. The +ve input 61 is connected to a first input node 71. The −ve input 62 is connected to a second input node 72. The output 63 is connected to an output node 73.

The first input node 71 is connected to a voltage V+ via a resistor R3 and to ground via a resistor R4. It also receives a feedback signal from the output node 63 via a resistor R2.

The second input node 72 is connected to the output node 73 via a resistor R2 and to the first pin contact 40.

When the A/B interface 12 is connected to a B-interface 22, the first pin contact is also connected to capacitor C2. The capacitors C2 and C1 are charged through resistor R1 when the output of the op-amp 64 is HIGH. The charging of the capacitors C1 and C2 increases the voltage at the second input node 72. The charging continues while the voltage at the second input node 72 is less than a first threshold T1. The first threshold T1 is determined by the HIGH output of the op-amp 64 and the voltage divider created by R2 and R4.

When the voltage at the second input node 72 exceeds the first threshold T1, the output of the op-amp 64 becomes LOW, the threshold of the op-amp 64 drops to T2 and the capacitors C1 and C2 are discharged. The threshold of the op-amp changes to a second lower threshold T2 determined by the voltage V+ and the voltage divider created by R3 and R4. The capacitor C2 discharges through the resistor R1 until the voltage at the second input node 72 drops below the second threshold T2. Then the output of the op-amp 64 goes HIGH and the cycle is started again.

An exaggerated schematic illustration of the voltage $V_{73}$ at the output node 73 and corresponding voltage $V_{72}$ at the second input node 72 is shown in FIGS. 4A and 4B. FIG. 4A illustrates the voltage traces when the first device 2 and second device 4 are connected and FIG. 4B illustrates the voltages traces when the first device 2 and second device 4 are not connected. The oscillations have a period of oscillation dependent upon the capacitance associated with the first pin contact 40. The period of oscillation is greater when the first and second devices are connected compared to when they are not connected.

Figure 5:
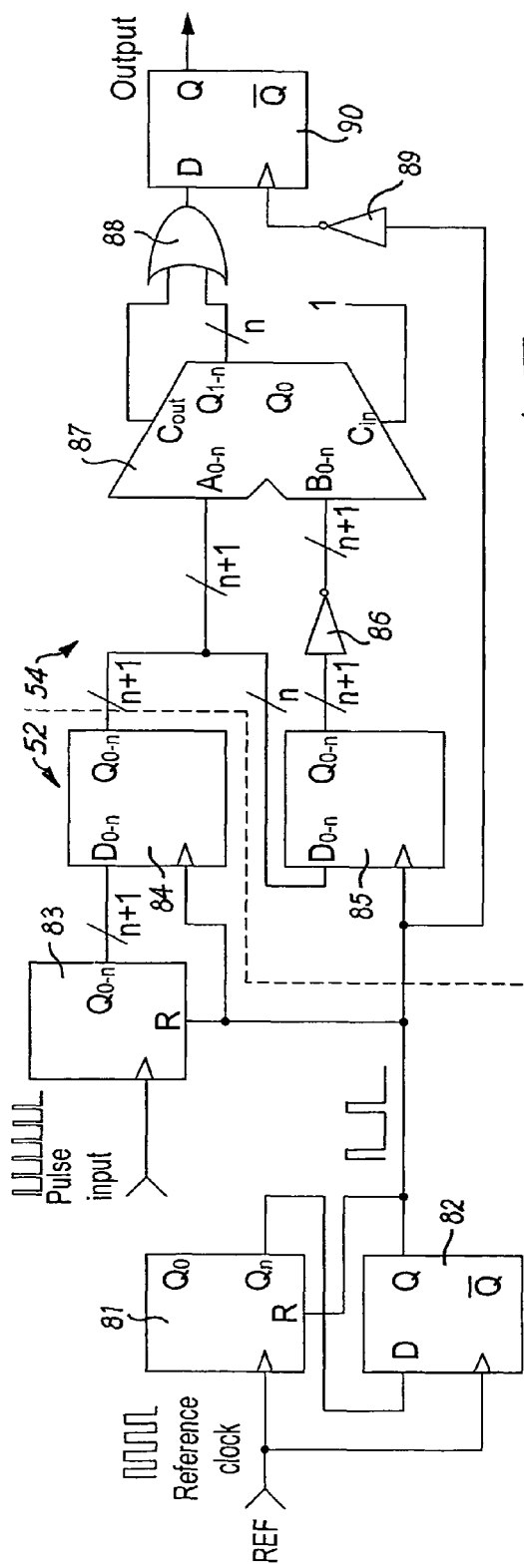
FIG. 5 illustrates an accumulator and a comparator for use in the impedance sensor illustrated in FIG. 3.

FIG. 5 illustrates an example of a suitable accumulator 52 and comparator 54 for use with the impedance senor illustrated in FIG. 3. A binary counter 81 and flip-flop 82 divide a reference clock REF and provide a clock of unequal mark-space ratio. These determines the period over which the pulses from sensor 50 are counted. The binary counter 83 counts the pulses from the sensor 50 and the parallel latch 84 store the result the CURRENT COUNT.

The parallel latch 85 holds the previous result—the PREVIOUS COUNT. The inverter 86 converts the adder 87 into a subtractor and the PREVIOUS COUNT (the output from parallel latch 85) is subtracted from the CURRENT COUNT (the output from parallel latch 84).

The output of the OR gate 88 only goes HIGH when the CURRENT COUNT is different from the PREVIOUS COUNT by at least 2. This prevents spurious detections of a frequency change.

The CURRENT COUNT is latched into the parallel latch 85 as the PREVIOUS COUNT.

Figure 6A:
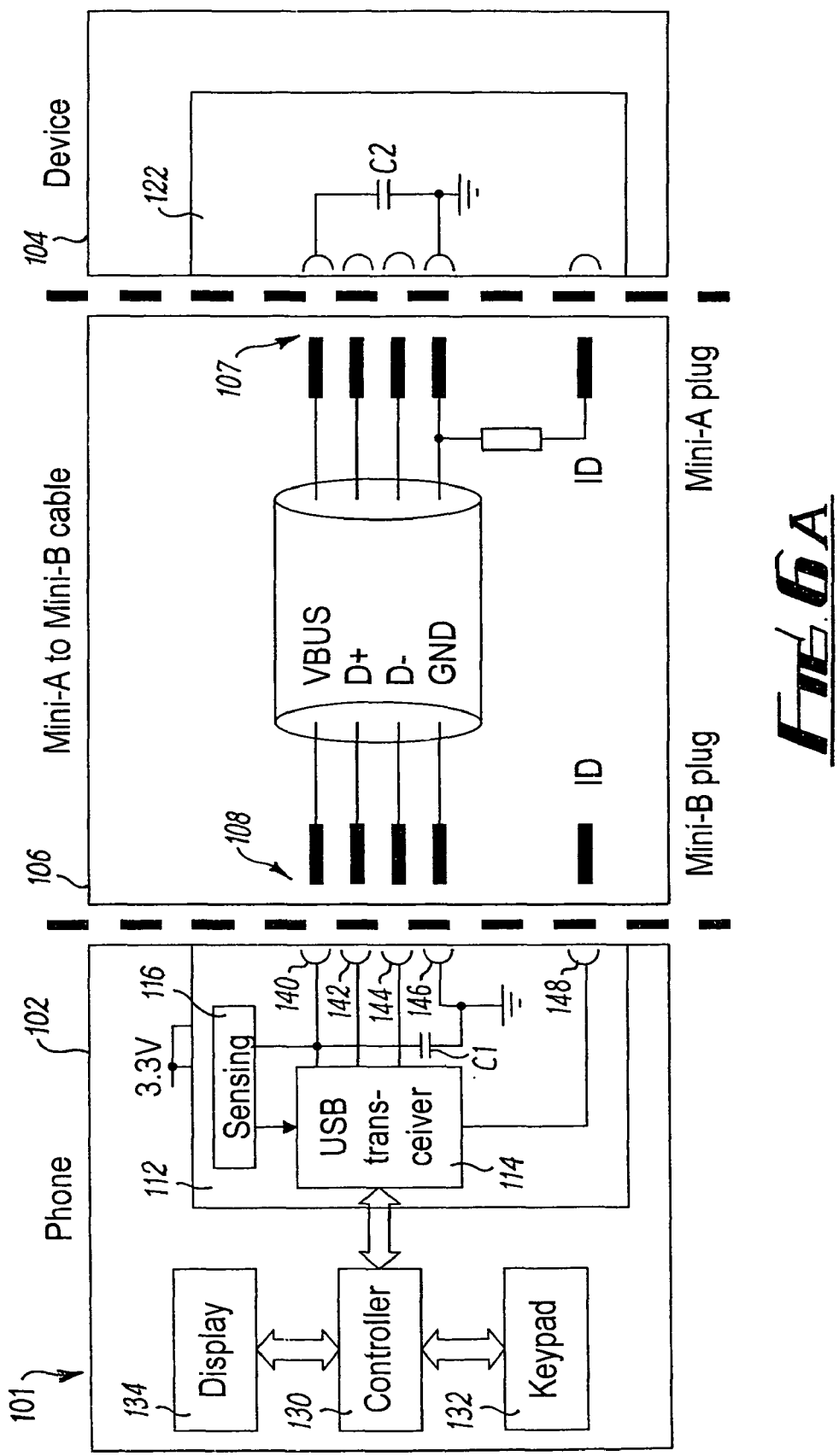
FIGS. 6A and 6B illustrate a Universal Serial Bus (USB) system according second and third embodiments.
Figure 6B:
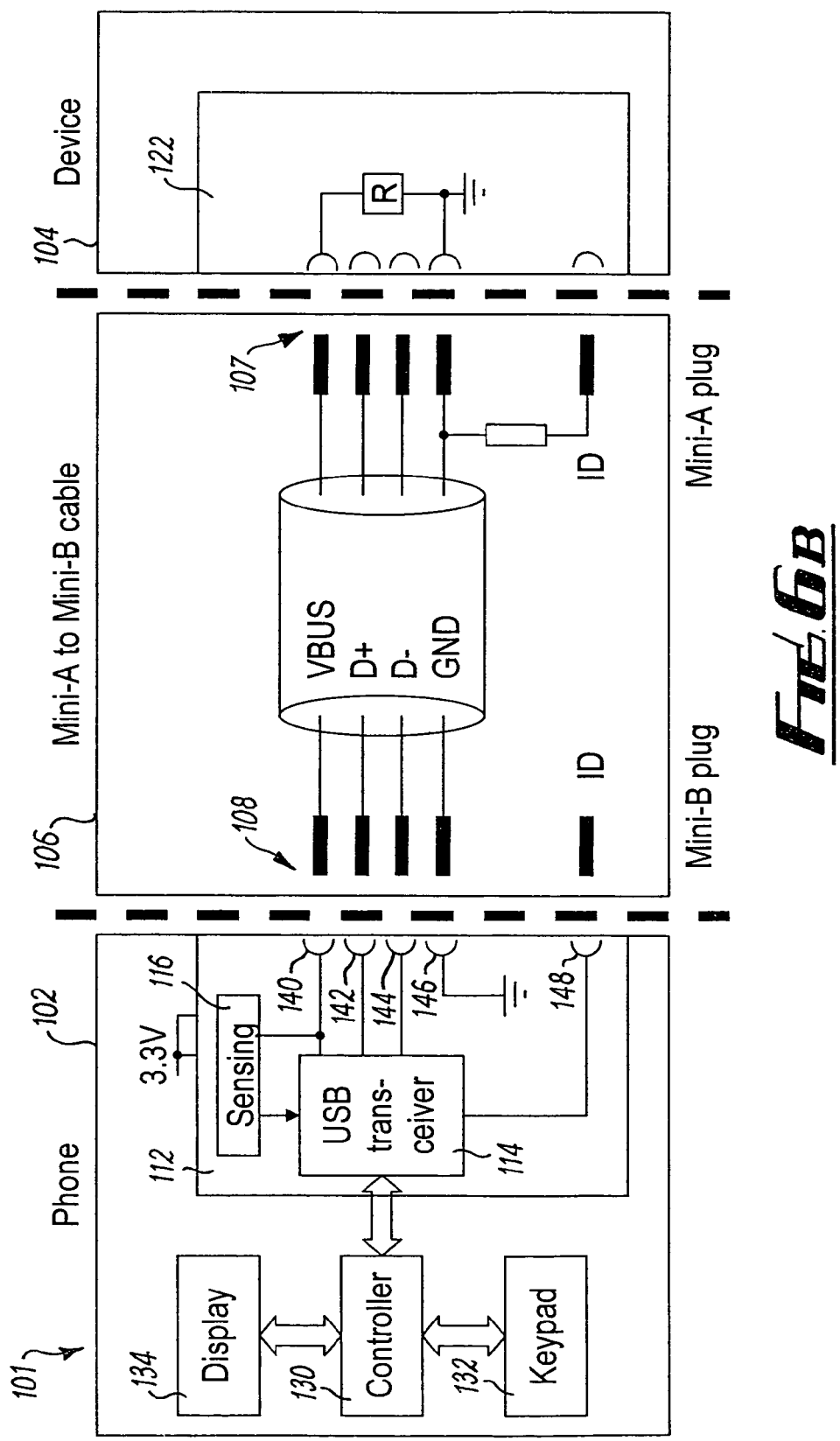

The flip-flop 90 latches the output from the OR gate 88. The optional inverter 89 is used to make the flip-flop 90 operate earlier and therefore allows the circuit to give a quicker response to changes in frequency of the pulse input FIGS. 6A and 6B illustrate a Universal Serial Bus (USB) system 101 comprising a first USB device 102 connected to a second device 104 using a cable 106.

The first USB device 102 is, in this example, a dual-mode device and has an interface 112 including a A/B mini receptacle (not shown). The A/B receptacle receives a mini B-plug 108 at one end of the cable 106. The interface 112 may therefore be referred to as an A/B interface but it operates, when connected as shown, as a B-interface or default peripheral interface.

The second USB device 104 is, in this example, another dual-mode device and has an interface 122 including a mini AB receptacle (not shown). The mini AB receptacle receives a mini A-plug 107 at the other end of the cable 106. The interface 112 may therefore be referred to as an A-interface or default host interface.

Although a cable 106 is illustrated it should be appreciated that adapters, dongles or the like may be connected directly to the A/B-interface 12 without a cable.

The A/B interface 112 of the first dual-mode device 2 comprises a USB transceiver 114 and five pin contacts. The first pin contact 140 (Vbus) is used to provide power from the A-device to the B-device. The second pin contact 142 (D+) and the third pin contact 144 (D−) are used as differential data lines for transmitting data between connected devices. The fourth pin contact 146 (GND) is used as an earth or ground. The fifth pin contact 148 (ID) is used to detect, in the first dual mode device 102, whether it is connected to a mini A-plug or a mini B-plug. A mini A-plug connects, when inserted, the fifth pin contact 148 (ID) to the fourth pin contact 146 (GND) via a resistor. A mini B-plug, when inserted, leaves the fifth pin contact 148 (ID) isolated.

The A/B interface 112 is capable of detecting automatically, without user intervention, a device connected to it using sensing circuitry 116. The sensing circuitry 116 automatically senses a discrete change in the impedance associated with the first pin contact 140.

The impedance associated with the first pin contact 140 has a first value when host and peripheral are not connected and a second value when host and peripheral are connected. The sensing circuitry 116 senses automatically a discrete change in the impedance associated with the first pin contact 140 from the first value to the second value. The sensing circuitry 116 also senses automatically a change in the impedance from the second value to the first value.

The A/B interface 112 is connected as a default peripheral interface in this example. The USB transceiver 114 starts a Session Request Protocol (SRP) in response to a discrete change in the impedance associated with the first pin contact. This requests the start of a session for serial data communication.

Enumeration may then occur. This is the process described in the USB specifications by which the second device 104 is allocated an address and data is sent from the second device 104 to the first device 102 that identifies the capabilities of the second device and enables communications between the first device 102 and the second device 104.

The first device 102 may comprise, in addition to A/B-interface 112, a controller 130, a keypad 132 and a display 134. The controller 130 is connected to provide outputs to the display 134 and the A/B interface 112 and to receive inputs from the keypad 132 and the USB transceiver 114 of the A/B interface 112.

The USB transceiver 114 provides a detection signal to the controller 130 in response to a discrete change in the impedance associated with the first pin contact. The controller 130 discovers the capabilities of the connected second device 104 during the process of enumeration.

The controller 130 may consequently control the display 134 to indicate when a device is connected or disconnected from A/B-interface 112. If a device is newly connected the controller 130 may automatically start a related application or display an identification of the device on the display 134.

According to one implementation illustrated in FIG. 6A, the sensing circuitry includes an impedance sensor 50, an accumulator 52 and a comparator 54 as illustrated in FIG. 2. In this embodiment the sensing circuitry 16 senses a stepwise change in the capacitance associated with the first pin contact 40 as previously described with reference to FIGS. 2, 3 and 4.

According to another implementation, illustrated in FIG. 6B, the sensing circuitry includes an impedance sensor 50' only. In this embodiment the sensing circuitry 116 senses a step-wise increase in the resistance associated with the first pin contact 140.

All USB A devices must offer a maximum Vbus to GND resistance of 100 kOhm. Consequently, when a connection is made between the A/B interface 112 and the A-interface 122, the resistance associated with the first pin contact 140 increases.

Figure 7:
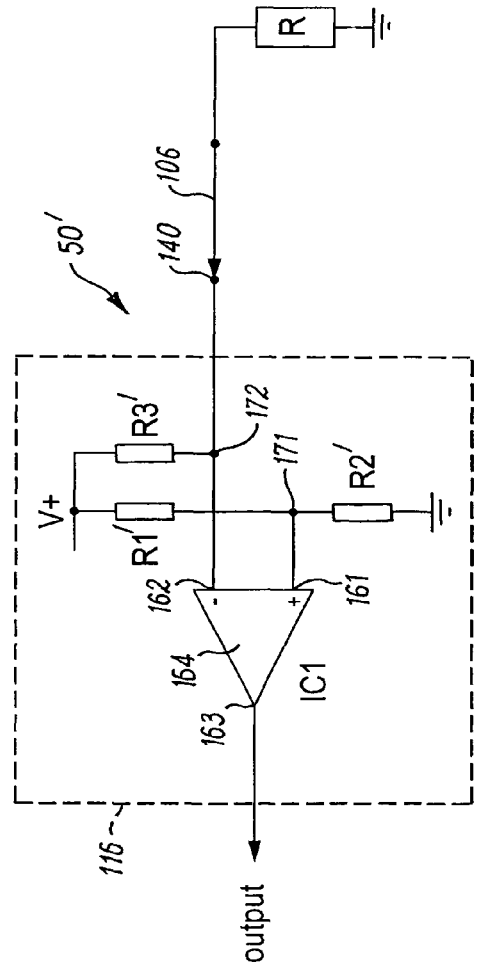
FIG. 7 illustrates sensing circuitry for the third embodiment.

A suitable impedance sensor 50' is illustrated in FIG. 7. The impedance sensor 50' comprises an op-amp 164. The op-amp 164 has a +ve input 161, a −ve input 162 and an output 163. The +ve input 161 is connected to a first input node 171. The −ve input 162 is connected to a second input node 172. The output 163 is connected to an output node 73.

The first input node 171 is connected to a voltage V+ via a resistor R1' and to ground via a resistor R2'. The resistor R1' and R2' form a voltage divider.

The second input node 172 is connected to the voltage V+ via a resistor R3' and to the first pin contact 140. The resistor R3' and a resistor R remotely connected to the first pin contact 140 form a voltage divider.

When the resistance associated with the first pin contact 140 is less than a threshold T, the output of the op-amp 164 is HIGH. When the resistance associated with the first pin contact 140 is greater than the threshold T, the output of the op-amp 164 is LOW. The threshold T is dependent upon the resistances R1', R2' and R3'.

The voltage applied to the first pin contact 140 by the impedance sensor 50' is less than 0.8V so that it is not mistaken for the initiation of Session Request Protocol.

Although the embodiments of FIGS. 1, 6A and 6B and have been described separately, it should be appreciated that is envisioned that a single dual mode device may have an A/B interface that provides the functionality of the A/B interface described with reference to FIG. 1 and the functionality of the A/B interface described with reference to FIG. 6. The functionality of FIG. 1 is used when the dual-mode device is connected as an A-device (default host) and the functionality of FIG. 6 is used when the dual-mode device is connected as a B-device (default peripheral).

Although embodiments of the present invention have been described in the preceding paragraphs with reference to various examples, it should be appreciated that modifications to the examples given can be made without departing from the spirit and scope of the invention.

The invention claimed is:

1. An apparatus, comprising:
a power signal contact having an associated impedance;
at least one data signal contact;
a transceiver configured to supply power and data to a peripheral device through the power signal contact and the at least one data signal contact;
a sensor configured to automatically sense a discrete change in impedance associated with the power signal contact and configured to provide to the transceiver a signal indicative of the discrete change in the impedance associated with the power signal contact, wherein the transceiver is configured to provide to a host device the signal indicative of the discrete change in the impedance associated with the power signal contact, the signal, when the power signal contact is not in use to provide power, being interpreted as a disconnection of the peripheral device from the apparatus, the apparatus being configured for serial data communication.

2. An apparatus as claimed in claim 1, for serial data communication between the host device and the peripheral device during a session, wherein the impedance associated with the power signal contact has a first value when the host device and the peripheral device are not connected and a second value when the host device and the peripheral device are connected and wherein the sensor is arranged to automatically sense a change in the impedance associated with the power signal contact from the first value to the second value.

3. An apparatus as claimed in claim 2, wherein the sensor is additionally arranged to automatically sense a change in the impedance associated with the power signal contact from the second value to the first value.

4. An apparatus as claimed in claim 2, wherein the second impedance value is greater than the first impedance value.

5. An apparatus as claimed in claim 1, wherein the sensor is arranged to detect a discrete change, greater than, a predetermined threshold value, in the impedance associated with the power signal contact.

6. An apparatus as claimed in claim 1, wherein the sensor is arranged to sense a discrete change in the capacitance associated with the power signal contact.

7. An apparatus as claimed in claim 6, wherein the sensor is arranged to generate an alternating voltage signal to the power signal contact.

8. An apparatus as claimed in claim 7, wherein the alternating voltage signal is a low voltage signal having a voltage of less than 0.2V.

9. An apparatus as claimed in claim 7, wherein the sensor is arranged to apply to the power signal contact an alternating voltage signal that has a frequency dependent upon the capacitance associated with the power signal contact and wherein the sensor is arranged to sense a change in the frequency of the alternating voltage signal.

10. An apparatus as claimed in claim 9, wherein the sensor comprises an oscillator having a time-constant of oscillation dependent upon the capacitance associated with the power signal contact.

11. An apparatus as claimed in claim 7, wherein the sensor is arranged to apply to the power signal contact an alternating voltage signal of constant frequency that has an amplitude dependent upon the capacitance associated with the power signal contact and wherein the sensor is arranged to sense a change in the amplitude of the alternating voltage signal.

12. An apparatus as claimed in claim 6, wherein the capacitance associated with the power signal contact when the host device and the peripheral device are not connected is approximately one half of the capacitance associated with the power signal contact when the peripheral and host are connected.

13. An apparatus as claimed in claim 6 for serial data communication between a the host device and the peripheral device during a session, which when connected as a default host interface applies a voltage to the power signal contact in response to sensing a discrete change in the impedance associated with the power signal contact.

14. An apparatus as claimed in claim 1, further comprising an identifier contact for identifying whether the apparatus is connected as a default peripheral interface or as a default host interface.

15. An apparatus as claimed in claim 1, wherein a session initiated after connection of the host and peripheral devices identifies the capabilities of a connected device.

16. An apparatus as claimed in claim 1 for serial data communication between the host and peripheral devices during a session, wherein the power signal contact is used for transferring power from the host device to the peripheral device during a session and the at least one data signal contact is used for serially communicating data between the host and peripheral devices during the session.

17. An apparatus as claimed in claim 16, connectable as a host interface, a default host interface) or a default peripheral interface.

18. An apparatus as claimed in claim 1, wherein the sensor generates an alternating voltage signal.

19. An apparatus as claimed in claim 1, wherein the sensor generates one of a high level voltage and a low level voltage.

20. An apparatus as claimed in claim 1, wherein, in an unconnected state of each of the apparatus and the peripheral device, capacitance between the power signal contact and ground of the apparatus is less than capacitance between power and ground of the peripheral device.

21. An apparatus as claimed in claim 1, wherein, in an unconnected state of each of the apparatus and the peripheral device, capacitance between the power signal contact and ground of the peripheral device is less than capacitance between power and ground of the apparatus.

22. An apparatus, comprising:
a power signal contact having an associated impedance;
at least one data signal contact; and
a sensor configured to automatically sense a discrete change in impedance associated with the power signal contact and configured to provide a signal indicative of the discrete change in the impedance associated with the power signal contact, when not in use to provide power, as a disconnection of a peripheral device from the apparatus, wherein the sensor is arranged to sense a discrete change in the capacitance associated with the power signal contact, the apparatus being configured for serial data communication between a host device and the peripheral device during a session, which when connected as a default peripheral interface starts a session request protocol in response to sensing the discrete change in the impedance associated with the power signal contact.

23. An apparatus, comprising:
a power signal contact having an associated impedance;
at least one data signal contact; and
a sensor configured to automatically sense a discrete change in impedance associated with the power signal contact and configured to provide signal indicative of the discrete change in the impedance associated with the power signal contact, when not in use to provide power, as a disconnection of the peripheral device from the apparatus, the apparatus being configured for serial data communication between a host device and the peripheral device during a session, wherein the sensor is arranged to sense a discrete change in the impedance associated with the power signal contact when the apparatus is connected as a default peripheral interface.

24. An apparatus as claimed in claim 23, wherein the sensor is arranged to sense the connection of a resistance of 100 kohms to the power signal contact.

25. An apparatus as claimed in claim 23, wherein the sensor applies a voltage to the power signal contact of less than 0.8V.

26. An apparatus as claimed in claim 23, wherein the sensor comprises a comparator and at least one voltage divider.

27. An apparatus as claimed in claim 23, arranged to start a session request protocol in response to sensing a discrete change in the resistance associated with the power signal contact.

28. A method comprising:
in a serial data connection between a host device and a peripheral device that are not involved in a data communication session, sensing by a sensor and providing by the sensor to a transceiver a signal indicative of a discrete change in an impedance associated with a power contact, providing by the transceiver to the host device the signal indicative of the discrete change in the impedance associated with the power contact, the power contact arranged to be configured to supply power to the peripheral device, the power contact being configured, during a data communication session, for transferring power from the host device to the peripheral device via the transceiver, and when the power contact is not in use to transfer power, the signal is provided by the transceiver to a controller configured to interpret the signal as disconnection of the peripheral.

29. A method as claimed in claim 28, wherein the sensing involves detecting an increase of the impedance associated with the contact above a threshold value.

30. A method as claimed in claim 28, wherein the sensing involves detecting a decrease of the impedance associated with the contact below a threshold value.

31. A method as claimed in claim 28, wherein the sensing involves sensing a change in capacitance.

32. A method as claimed in claim 31, wherein the sensing involves applying a low voltage, alternating signal to the contact.

33. A method as claimed in claim 28, wherein the sensing involves sensing a change in resistance.

34. An apparatus, comprising:
a power signal contact having an associated capacitance;
at least one data signal contact;
a transceiver configured to supply power and data to a first device connected to the apparatus; and
a sensor configured to automatically sense a discrete change in capacitance associated with the power signal contact, the sensor configured to provide to the transceiver a signal indicative of the discrete change in the capacitance associated with the power signal contact, which signal, when the power signal contact is not in use to provide power, is interpreted as a disconnection of the first device from the apparatus, the apparatus being configured for serial data communication, wherein the transceiver and the sensor are distinct components of the apparatus, wherein the transceiver is configured to provide the signal indicative of the discrete change in the capacitance associated with the power signal contact to a second device.

35. An apparatus as claimed in claim 34, wherein the transceiver is configured to disconnect the power signal contact from a power supply controlled by the second device.

36. An apparatus as claimed in claim 34, for serial data communication between the first and second devices during a session, wherein the capacitance associated with the power signal contact has a first value when the first and second devices are not connected and a second value when the first and second devices are connected and wherein the sensor is arranged to automatically sense a change in the capacitance associated with the power signal contact from the first value to the second value.

37. An apparatus as claimed in claim 34, wherein the sensor is additionally arranged to automatically sense a change in the capacitance associated with the power signal contact from the second value to the first value.

38. An apparatus as claimed in claim 34, wherein the sensor is arranged to detect a discrete change, greater than a predetermined threshold value, in the capacitance associated with the power signal contact.

39. An apparatus as claimed in claim 34, wherein the sensor is arranged to generate an alternating voltage signal to the power signal contact.

40. An apparatus as claimed in claim 39, wherein the sensor is arranged to apply to the power signal contact an alternating voltage signal that has a frequency dependence upon the capacitance associated with the power signal contact and wherein the sensor is arranged to sense a change in the frequency of the alternating voltage signal.

41. An apparatus as claimed in claim 40, wherein the sensor comprises an oscillator having a time-constant of oscillation dependent upon the capacitance associated with the power signal contact.

42. An apparatus as claimed in claim 39, wherein the sensor is arranged to apply to the power signal contact an alternating voltage signal of constant frequency that has an amplitude dependent upon the capacitance associated with the power signal contact and wherein the sensor is arranged to sense a change in the amplitude of the alternating voltage signal.

43. An apparatus as claimed in claim 34 for serial data communication between the first and second devices during a session, the apparatus when connected as a default host interface is configured to apply a voltage to the power signal contact in response to sensing a discrete change in the capacitance associated with the power signal contact.

44. An apparatus as claimed in claim 34, wherein the sensor comprises a comparator and at least one voltage divider.

45. An apparatus as claimed in claim 34, wherein a session initiated after connection of the first and second devices identifies the capabilities of a connected device.

46. An apparatus as claimed in claim 34 for serial data communication between the first and second devices during a session, wherein the power signal contact is used for transferring power from the second device to the first device during a session and the at least one data signal contact is used for serially communicating data between the first and second devices during the session.

47. An apparatus as in claim 34, connectable as a host interface, a default host interface, or a default peripheral interface.

48. A method comprising:
in a serial data connection between a host and a peripheral that passes through an interface where the host and the peripheral are not involved in a data communication session, sensing by a sensor in the interface and providing a signal indicative of a discrete change in a capacitance associated with a power contact from the sensor to a transceiver of the interface and from the transceiver to the host, the power contact being configured, during a session, for transferring power from the host to the peripheral via the transceiver of the interface, and when the power contact is not in use to transfer power, the signal from the sensor is provided by the transceiver to a controller in the host which is configured to interpret the signal as disconnection of the peripheral, the transceiver being configured to transfer data from the host to the peripheral.

49. A method as claimed in claim 48, wherein the sensing involves detecting an increase of the impedance associated with the power contact above a threshold value.

50. A method as claimed in claim 48, wherein the sensing involves detecting a decrease of the impedance associated with the power contact below a threshold value.

51. An apparatus, comprising:
a controller;
a input member configured to provide input to the controller of the apparatus; and
an interface for serial data communication, the interface comprising a power signal contact having an associated capacitance; at least one data signal contact; a transceiver; and a sensor configured to automatically sense a discrete change in the capacitance associated with the power signal contact, the interface configured to communicate with the controller, the transceiver configured to transfer power and data from the apparatus to a peripheral device when the peripheral device is electrically connected to the interface, the transceiver configured to receive a signal from the sensor in response to the sensor's sensing of the discrete change in the capacitance associated with the power signal contact when the power signal contact is not in use to provide power, the transceiver configured to provide the signal in response to the sensor's sensing of the discrete change in the capacitance associated with the power signal contact, the signal from the sensor in response to the sensor's sensing of the discrete change in the capacitance associated with the power signal contact being interpreted as a disconnection of the peripheral device from the interface.

52. An apparatus as in claim 51, wherein the interface is configured to communicate with the controller through the transceiver.

53. An apparatus as in claim 52, wherein the interface is configured for serial data communication between the apparatus and the peripheral device, which when connected starts a session request protocol in response to sensing a discrete change in capacitance associated with the power signal contact, the apparatus further comprising a display configured to be controlled by the controller, the apparatus comprising a phone.

54. A circuit, comprising:
interface circuitry for serial data communication, the interface circuitry comprising a sensor configured to automatically sense a discrete change in the capacitance associated with a power signal contact having an associated capacitance, when not in use to provide power, the interface circuitry configured to be in communication with controller circuitry, the controller circuitry being configured to control a display and to receive input from an input member, the interface circuitry interfacing through the power signal contact and at least one data signal contact, the interface circuitry further comprising transceiving circuitry configured to control a transfer of power and data from the controller circuitry to a peripheral device and configured to permit communications between the interface circuitry and the controller circuitry, the sensor configured to provide a signal indicative of the discrete change in capacitance to the transceiving circuitry, which signal is interpreted as a disconnection of the peripheral device from the circuit and which signal the transceiving circuitry is configured to provide to the controller circuitry.

55. A circuit as in claim 54, wherein the circuit and the controller circuitry comprise a phone.

56. A circuit as in claim 55, the phone further comprising a display configured to be controlled by the controller circuitry and an input member configured for entering data to the phone.

* * * * *

UNITED STATES PATENT AND TRADEMARK OFFICE
CERTIFICATE OF CORRECTION

| | |
|---|---|
| PATENT NO. | : 8,271,714 B2 |
| APPLICATION NO. | : 10/732063 |
| DATED | : September 18, 2012 |
| INVENTOR(S) | : Ede |

It is certified that error appears in the above-identified patent and that said Letters Patent is hereby corrected as shown below:

Claim 17, col. 8, line 34 delete "interface)" and insert --interface--.

Claim 23, col. 9, line 6 delete "providesignal" and insert --provide a signal--.

Signed and Sealed this
Twentieth Day of November, 2012

David J. Kappos
*Director of the United States Patent and Trademark Office*